United States Patent
Lobaton et al.

(10) Patent No.: US 10,836,043 B1
(45) Date of Patent: Nov. 17, 2020

(54) MOBILE DEVICE AUTOMATION ROBOT

(71) Applicant: FMR LLC, Boston, MA (US)

(72) Inventors: Edgar Lobaton, Raleigh, NC (US);
Farrokh Mohammadzadeh, Belmont, CA (US); Michael Tran, Raleigh, NC (US); Jeremy Alexander Cole, Graham, NC (US); Ross Inman, Raleigh, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/779,054

(22) Filed: Jan. 31, 2020

(51) Int. Cl.
*B25J 9/16* (2006.01)
*B25J 13/08* (2006.01)
(Continued)

(52) U.S. Cl.
CPC ............ *B25J 9/1679* (2013.01); *B25J 9/104* (2013.01); *B25J 9/12* (2013.01); *B25J 9/1697* (2013.01);
(Continued)

(58) Field of Classification Search
CPC ............ G06F 11/2221; G06F 11/3664; G06F 3/0346; G06F 3/0412; G06F 3/044;
(Continued)

(56) References Cited

U.S. PATENT DOCUMENTS

| | | | | |
|---|---|---|---|---|
| 7,646,193 B2 * | 1/2010 | Suzuki | ............... | G01M 99/008 324/756.01 |
| 7,978,182 B2 * | 7/2011 | Ording | ................. | G06F 1/1626 345/173 |

(Continued)

FOREIGN PATENT DOCUMENTS

| | | |
|---|---|---|
| CN | 202171626 U | 3/2012 |
| CN | 105763705 A | 7/2016 |

OTHER PUBLICATIONS

Web article, "OptoFidelity introduced the first automated test system for Microsoft Touch HCK" See second headline: Key features of OptoFidelity Automated Windows HCK Test System: . . . Industrial robot setup with safety screening . . . Two-finger actuator (converge/semantic zoom tests) and multi-finger actuator tools (3 pcs). See also: https://www.optofidelity.com/optofidelity-introduced-first-automated-test-system-microsoft-touch-hck-2/ See also YouTube video "OptoFidelity Two Fingers-robot": https://www.youtube.com/watch?v=YppRASbXHfk.

*Primary Examiner* — Jonathan M Dunlap
(74) *Attorney, Agent, or Firm* — Proskauer Rose LLP (57) ABSTRACT

The invention includes a method of testing a mobile device with a robotic testing device having a holder, a first motor operatively connected to a first robotic implement, and a second motor operatively connected to a second robotic implement. The method includes securing, via the holder, the mobile device to the robotic testing device; actuating, via the first motor, the first robotic implement to contact the mobile device at a first location at a first time; actuating, via the second motor, the second robotic implement to contact the mobile device at a second location at a second time; and recording, via a data processor of the robotic testing device, a response of the mobile device in memory of the robotic testing device. The robotic testing device includes a pressure feedback sensor configured to sense a pressure of one or more of the robotic implements while interacting with the mobile device.

28 Claims, 4 Drawing Sheets

(51) Int. Cl.
  *B25J 9/10* (2006.01)
  *G01M 99/00* (2011.01)
  *B25J 15/00* (2006.01)
  *B25J 9/12* (2006.01)
  *G06F 3/041* (2006.01)
  *G06F 3/0346* (2013.01)
  *G06F 11/22* (2006.01)

(52) U.S. Cl.
  CPC ......... *B25J 13/081* (2013.01); *B25J 15/0019* (2013.01); *G01M 99/005* (2013.01); *G06F 3/0346* (2013.01); *G06F 3/0412* (2013.01); *G06F 11/2221* (2013.01)

(58) Field of Classification Search
  CPC ........ G06F 3/017; G06F 3/041; G06F 3/0416; B25J 11/00; B25J 13/085; B25J 13/081; B25J 19/021; B25J 9/0096; B25J 9/1697; B25J 9/1679; B25J 9/02; B25J 9/104; B25J 9/12; B25J 15/0441; B25J 15/0491; B25J 15/0019; Y10S 901/47; Y10S 901/02; Y10S 901/14; Y10S 901/16; Y10S 901/30; Y10S 901/50; G01L 1/25; G01M 99/005
  See application file for complete search history.

(56) References Cited

U.S. PATENT DOCUMENTS

| | | | | |
|---|---|---|---|---|
| 8,061,223 | B2* | 11/2011 | Pan | G06F 3/041 |
| | | | | 73/865.3 |
| 8,761,938 | B2* | 6/2014 | Jenkinson | B25J 13/085 |
| | | | | 700/259 |
| 8,768,515 | B2* | 7/2014 | Jenkinson | G06K 9/2027 |
| | | | | 700/259 |
| 8,774,793 | B2* | 7/2014 | Fishel | H01Q 1/241 |
| | | | | 455/115.1 |
| 8,996,166 | B2* | 3/2015 | Jenkinson | G06F 3/0418 |
| | | | | 345/174 |
| 9,024,899 | B2* | 5/2015 | Rovito | G06F 3/0418 |
| | | | | 345/158 |
| 9,138,896 | B2* | 9/2015 | Jenkinson | B25J 9/0096 |
| 9,283,672 | B1* | 3/2016 | Matthews | G01M 99/008 |
| 9,317,147 | B2* | 4/2016 | Welch | H04N 17/00 |
| 9,384,121 | B2* | 7/2016 | Jackson | H04W 4/029 |
| 9,469,037 | B2* | 10/2016 | Matthews | G01M 99/008 |
| 9,481,084 | B2* | 11/2016 | Park | B25J 9/1612 |
| 9,576,209 | B2* | 2/2017 | Jenkinson | B25J 9/1697 |
| 9,652,077 | B2* | 5/2017 | Jenkinson | G06F 3/0418 |
| 9,718,196 | B2* | 8/2017 | Matthews | G01M 99/008 |
| 9,821,468 | B2* | 11/2017 | Jenkinson | B25J 9/1697 |
| 9,948,411 | B2* | 4/2018 | Diperna | H04W 4/02 |
| 9,962,838 | B2* | 5/2018 | Seong | B25J 9/1697 |
| 10,104,560 | B2* | 10/2018 | Liu | G06F 3/03545 |
| 10,120,474 | B2* | 11/2018 | Jenkinson | G06F 11/2221 |
| 10,144,133 | B2* | 12/2018 | Jenkinson | B25J 9/0096 |
| 10,171,184 | B2* | 1/2019 | Diperna | H04M 1/04 |
| 10,222,884 | B2* | 3/2019 | Yang | G06T 7/001 |
| 10,432,328 | B2* | 10/2019 | Diperna | H04B 17/29 |
| 10,491,314 | B2* | 11/2019 | Diperna | H04W 4/02 |
| 10,530,499 | B2* | 1/2020 | Diperna | H04B 17/11 |
| 10,617,234 | B2* | 4/2020 | Esnard-Domerego | G05B 19/409 |
| 2007/0205751 | A1* | 9/2007 | Suzuki | G01M 99/008 |
| | | | | 324/756.01 |
| 2009/0241701 | A1* | 10/2009 | Pan | G06F 3/041 |
| | | | | 73/865.9 |
| 2009/0265035 | A1* | 10/2009 | Jenkinson | G06K 9/00664 |
| | | | | 700/259 |
| 2009/0312009 | A1* | 12/2009 | Fishel | H01Q 1/241 |
| | | | | 455/425 |
| 2012/0146956 | A1* | 6/2012 | Jenkinson | G06F 3/0418 |
| | | | | 345/178 |
| 2012/0280934 | A1* | 11/2012 | Ha | G06F 3/0416 |
| | | | | 345/174 |
| 2013/0317650 | A1* | 11/2013 | Jenkinson | G06K 9/03 |
| | | | | 700/259 |
| 2013/0345864 | A1* | 12/2013 | Park | B25J 9/1612 |
| | | | | 700/248 |
| 2014/0111484 | A1* | 4/2014 | Welch | G06F 3/041 |
| | | | | 345/178 |
| 2014/0111485 | A1* | 4/2014 | Welch | G06F 3/041 |
| | | | | 345/178 |
| 2014/0278187 | A1* | 9/2014 | Rovito | G06F 3/0418 |
| | | | | 702/104 |
| 2014/0309775 | A1* | 10/2014 | Jenkinson | G06F 3/0418 |
| | | | | 700/250 |
| 2014/0336819 | A1* | 11/2014 | Jenkinson | B25J 9/1697 |
| | | | | 700/259 |
| 2015/0347086 | A1* | 12/2015 | Liedholm | H04M 1/7253 |
| | | | | 715/728 |
| 2015/0371099 | A1* | 12/2015 | Jenkinson | B25J 11/00 |
| | | | | 700/259 |
| 2016/0026560 | A1* | 1/2016 | Jackson | H04W 4/029 |
| | | | | 714/38.1 |
| 2016/0089792 | A1* | 3/2016 | Ojalehto | B25J 15/0441 |
| | | | | 73/865.6 |
| 2016/0167238 | A1* | 6/2016 | Matthews | G01M 99/008 |
| | | | | 73/118.01 |
| 2016/0187876 | A1* | 6/2016 | Diperna | G06F 3/0346 |
| | | | | 702/81 |
| 2016/0192213 | A1* | 6/2016 | Diperna | H04B 17/11 |
| | | | | 455/425 |
| 2016/0271801 | A1* | 9/2016 | Seong | B25J 9/1697 |
| 2016/0320889 | A1* | 11/2016 | Jenkinson | G06F 11/2221 |
| 2016/0337053 | A1* | 11/2016 | Diperna | H04W 4/80 |
| 2017/0011504 | A1* | 1/2017 | Yang | G06T 7/001 |
| 2017/0024084 | A1 | 1/2017 | Paloniemi et al. | |
| 2017/0028569 | A1* | 2/2017 | Matthews | G01M 99/008 |
| 2017/0156073 | A1* | 6/2017 | Liu | G06F 3/03545 |
| 2017/0165842 | A1* | 6/2017 | Jenkinson | G06K 9/03 |
| 2017/0252923 | A1* | 9/2017 | Esnard-Domerego | A47F 7/00 |
| 2018/0036886 | A1* | 2/2018 | Jenkinson | G06K 9/00664 |
| 2018/0180645 | A1* | 6/2018 | Fenton | G01R 1/06711 |
| 2018/0268378 | A1* | 9/2018 | Liu | H04M 1/0287 |
| 2018/0316443 | A1* | 11/2018 | Diperna | H04N 7/18 |
| 2019/0020423 | A1* | 1/2019 | Diperna | G05B 19/41875 |
| 2019/0064981 | A1* | 2/2019 | Jenkinson | B25J 9/02 |

* cited by examiner

MOBILE DEVICE AUTOMATION ROBOT

TECHNICAL FIELD

This application relates generally to systems, methods and apparatuses, including computer programs, for mobile device testing. More specifically, this application relates to using an improved mobile device automation robot to test mobile devices in a range of real-world use scenarios.

BACKGROUND

Mobile device testing currently uses a combination of hardware (e.g., robots) and software (e.g., simulators) to test one or more aspects of a user experience under controlled scenarios. One or more user commands can be simulated in a testing environment, and testing results can be recorded for later review. As mobile devices grow more complex and receive greater amounts of input from an expanded range of sources (e.g., a user touch screen, multiple touch buttons, one or more cameras, a microphone, a gyroscope, a GPS, an accelerometer, and/or a fingerprint reader), the opportunity for error increases both within the mobile device's operating system and on any applications running on the mobile device. As a result, more sophisticated testing devices are required to simulate the range of scenarios that a mobile device may experience in the course of real world usage. Previous attempts to meet this growing need have been rudimentary and have had limited success.

SUMMARY

Accordingly, the invention provides a framework, including a robotic testing system, software, and associated computing methods and modules, for providing more sophisticated mobile automation testing. In some embodiments, the invention provides a new robot design to more accurately simulate a greater variety of real world use scenarios (e.g., using physical implements simulating human fingers) so that a greater number of latent errors in mobile applications and/or operating systems can be detected, recorded, analyzed and preempted.

For example, in a typical model use scenario, a user may log into an application by (1) swiping, from the home screen, to a screen including an icon for accessing the application; (2) clicking on the application; (3) typing a username; (4) typing a password; and (5) clicking the "log in" button. However, the user could also accidentally swipe past the appropriate screen before returning to it; mis-click on the screen before clicking appropriately; or type an incorrect username or password and use the "backspace" key one or more times before clicking "log in." The robotic testing system can be configured to execute both the model and the imperfect test cases using only hardware to simulate human interaction with the mobile test device, while software subsequently determines whether has been an error, reports any uncovered errors, and generates log files (e.g., using Selenium or Appium and external log cleaners) to track errors. The test system can also allow a faster time to market, e.g., by allowing testing of new physical features of a device without the need to support new software testing methods.

In one aspect, the invention features a method of testing a mobile device with a robotic testing device having a holder, a first motor operatively connected to a first robotic implement, and a second motor operatively connected to a second robotic implement. The method includes securing, via the holder, the mobile device to the robotic testing device. The method also includes actuating, via the first motor, the first robotic implement to contact the mobile device at a first location at a first time. The method also includes actuating, via the second motor, the second robotic implement to contact the mobile device at a second location at a second time. The method also includes recording, via a data processor of the robotic testing device, a response of the mobile device in memory of the robotic testing device.

In some embodiments, the robotic testing device also includes a pressure feedback sensor configured to sense a pressure of one or more of the robotic implements while interacting with the mobile device. In some embodiments, the first motor is operatively connected to a first belt-driven system. In some embodiments, the second motor is operatively connected to a second belt-driven system. In some embodiments, the first and second motors are servo motors that are in electronic communication with first and second servo controllers, respectively. In some embodiments, the first and second servo controllers are in electronic communication with a host controller. In some embodiments, the first and second motors are stepper motors that are in electronic communication with first and second stepper controllers, respectively. In some embodiments, the first and second stepper controllers are in electronic communication with a host controller. In some embodiments, the first and second robotic implements are each one of a stylus, a pointer, or a finger-type implement. In some embodiments, the method further includes engaging, by a third robotic implement of the robotic testing device, a rocker button of the mobile device. In some embodiments, the third robotic implement has a cross-member structure. In some embodiments, the method further includes moving, by a third motor operatively coupled to the holder, the holder to emulate a human movement.

In some embodiments, at least one of the first and second robotic implements are configured to emulate one or more of the following human movements on the mobile device: a light touch click; a hard touch click; a hard touch click-and-hold; a rotation; a shaking motion; a pinch-open motion to zoom in on the mobile device; a pinch-close motion to zoom out on the mobile device; a force touch; an acceleration of the mobile device; a dual touch; a long press; an object drag on a screen of the mobile device; a swipe motion. In some embodiments, the mobile device is positioned vertically or near vertically with respect to a ground plane. In some embodiments, the robotic testing device is configured such that a distance between a center of the first robotic implement and a center of the second robotic implements is as low as three millimeters. In some embodiments, the robotic testing device is installed with software configured to determine whether an error has occurred on the mobile device and to log any errors detected. In some embodiments, the robotic testing device further includes a video camera, the video camera for either recording interactions of the robotic testing device with the mobile device or facilitating interactions of the robotic testing device with the mobile device.

In another aspect, the invention features a system for robotic testing of a mobile device with a robotic testing device. The system includes a holder configured to secure the mobile device to the robotic testing device. The system also includes a first robotic implement configured to move along a first axis to interact with the mobile device. The system also includes a first motor operatively coupled to the first robotic implement and configured to actuate the first robotic implement. The system also includes a second robotic implement configured to move along a second axis to interact with the mobile device. The system also includes a second motor operatively coupled to the second robotic implement and configured to actuate the second robotic implement. The system also includes a processor programmed with computer readable instructions to execute computer program instructions configured to cause the processor to: (i) actuate, via the first motor, the first robotic implement to contact the mobile device at a first location at a first time; (ii) actuate, via the second motor, the second robotic implement to contact the mobile device at a second location at a second time; and (iii) record, by the robotic testing device, a response of the mobile device in memory of the robotic testing device. The robotic testing device includes a pressure feedback sensor configured to sense a pressure of one or more of the robotic implements while interacting with the mobile device.

In some embodiments, the first motor is operatively connected to a first belt-driven system. In some embodiments, the second motor is operatively connected to a second belt-driven system. In some embodiments, the first and second motors are servo motors that are in electronic communication with first and second servo controllers, respectively, and the first and second servo controllers are in electronic communication with a host controller. In some embodiments, the first and second motors are stepper motors that are in electronic communication with first and second stepper controllers, respectively. In some embodiments, the first and second stepper controllers are in electronic communication with a host controller. In some embodiments, the first and second robotic implements are each one of a stylus, a pointer, or a finger-type implement. In some embodiments, the system further includes a third robotic implement having a cross-member structure configured to engage a rocker button of the mobile device. In some embodiments, the system further includes a third motor coupled to the holder and configured to move the holder to emulate human movement.

In some embodiments, at least one of the first and second robotic implements are configured to emulate one or more of the following human movements on the mobile device: a light touch click; a hard touch click; a hard touch click-and-hold; a rotation; a shaking motion; a pinch-open motion to zoom in on the mobile device; a pinch-close motion to zoom out on the mobile device; a force touch; an acceleration of the mobile device; a dual touch; a long press; an object drag on a screen of the mobile device; a swipe motion. In some embodiments, the mobile device is positioned vertically or near vertically with respect to a ground plane. In some embodiments, the robotic testing device is configured such that distance between a center of the first robotic implement and a center of the second robotic implements is as low as three millimeters. In some embodiments, the robotic testing device is installed with software configured to determine whether an error has occurred on the mobile device and to log any errors. In some embodiments, the robotic testing device further includes a camera for recording interactions of the robotic testing device with the mobile device on video.

In another aspect, the invention features a method of testing a mobile device with a robotic testing device having a holder, a first motor operatively connected to a first robotic implement, and a second motor operatively connected to a second robotic implement. The method includes securing, via the holder, the mobile device to the robotic testing device. The method also includes actuating, via the first motor, the first robotic implement to contact the mobile device at a first location at a first time. The method also includes actuating, via the second motor, the second robotic implement to contact the mobile device at a second location at a second time. The method also includes recording, via a data processor of the robotic testing device, a response of the mobile device in memory of the robotic testing device. The first and second robotic implements are each one of a stylus, a pointer, or a finger-type implement capable of controllably contacting the mobile device with multiple distinct levels of force. In some embodiments, the first and second robotic implements each further include one or more haptic feedback sensors in electronic communication with the processor.

In another aspect, the invention features a system for robotic testing of a mobile device with a robotic testing device. The system includes a holder configured to secure the mobile device to the robotic testing device. The system also includes a first robotic implement configured to move along a first axis to interact with the mobile device. The system also includes a a first motor operatively coupled to the first robotic implement and configured to actuate the first robotic implement. The system also includes a second robotic implement configured to move along a second axis to interact with the mobile device. The system also includes a second motor operatively coupled to the second robotic implement and configured to actuate the second robotic implement. The system also includes a processor programmed with computer readable instructions to execute computer program instructions configured to cause the processor to: (i) actuate, via the first motor, the first robotic implement to contact the mobile device at a first location and a first time; (ii) actuate, via the second motor, the second robotic implement to contact the mobile device at a second location and a second time; and (iii) record, by the robotic testing device, a response of the mobile device in memory of the robotic testing device. The first and second robotic implements are each one of a stylus, a pointer, or a finger-type implement capable of controllably contacting the mobile device with multiple distinct levels of force. In some embodiments, the first and second robotic implements each further include one or more haptic feedback sensors in electronic communication with the processor.

In another aspect, the invention features a method of testing a mobile device with a robotic testing device having a holder, a first motor operatively connected to a first robotic implement, and a second motor operatively connected to a second robotic implement. The method includes securing, via the holder, the mobile device to the robotic testing device. The method also includes actuating, via the first motor, the first robotic implement to contact the mobile device at a first location at a first time. The method also includes actuating, via the second motor, the second robotic implement to contact the mobile device at a second location at a second time. The method also includes recording, via a data processor of the robotic testing device, a response of the mobile device in memory of the robotic testing device. The robotic testing device further includes a pressure sensor configured to monitor or mediate a pressure of one or more of the robotic implements while interacting with the mobile device.

In another aspect, the invention features a method of testing a mobile device with a robotic testing device having a holder, a first motor operatively connected to a first robotic implement, a second motor operatively connected to a second robotic implement, and a third motor operatively connected to a third robotic implement. The method includes securing, via the holder, the mobile device to the robotic testing device. The method also includes actuating, via the first motor, the first robotic implement to contact the mobile device at a first location at a first time. The method also includes actuating, via the second motor, the second robotic implement to contact the mobile device at a second location at a second time. The method also includes engaging, via the third motor, by the third robotic implement, a rocker button of the mobile device, the third robotic implement having a cross-member structure. The method also includes recording, via a data processor of the robotic testing device, a response of the mobile device in memory of the robotic testing device.

In another aspect, the invention features a method of testing a mobile device with a robotic testing device having a holder, a first motor operatively connected to a first robotic implement, and a second motor operatively connected to a second robotic implement. The method includes securing, via the holder, the mobile device to the robotic testing device. The method also includes actuating, via the first motor, the first robotic implement to contact the mobile device at a first location at a first time. The method also includes actuating, via the second motor, the second robotic implement to contact the mobile device at a second location at a second time. The method also includes moving, by a third motor coupled to the holder, the holder to emulate a human movement. The method also includes recording, via a data processor of the robotic testing device, a response of the mobile device in memory of the robotic testing device.

In another aspect, the invention features a system for robotic testing of a mobile device with a robotic testing device. The system includes a holder configured to secure the mobile device to the robotic testing device. The system also includes a first robotic implement configured to move along a first axis to interact with the mobile device. The system also includes a first motor operatively coupled to the first robotic implement and configured to actuate the first robotic implement. The system also includes a second robotic implement configured to move along a second axis to interact with the mobile device. The system also includes a second motor operatively coupled to the second robotic implement and configured to actuate the second robotic implement. The system also includes a processor programmed with computer readable instructions to execute computer program instructions configured to cause the processor to: (i) actuate, via the first motor, the first robotic implement to contact the mobile device at a first location and a first time; (ii) actuate, via the second motor, the second robotic implement to contact the mobile device at a second location and a second time; and (iii) record, by the robotic testing device, a response of the mobile device in memory of the robotic testing device. The robotic testing device further includes a pressure sensor configured to monitor or mediate a pressure of one or more of the robotic implements while interacting with the mobile device.

In another aspect, the invention features a system for robotic testing of a mobile device with a robotic testing device. The system includes a holder configured to secure the mobile device to the robotic testing device. The system also includes a first robotic implement configured to move along a first axis to interact with the mobile device. The system also includes a first motor operatively coupled to the first robotic implement and configured to actuate the first robotic implement. The system also includes a second robotic implement configured to move along a second axis to interact with the mobile device. The system also includes a second motor operatively coupled to the second robotic implement and configured to actuate the second robotic implement. The system also includes a processor programmed with computer readable instructions to execute computer program instructions configured to cause the processor to: (i) actuate, via the first motor, the first robotic implement to contact the mobile device at a first location and a first time; (ii) actuate, via the second motor, the second robotic implement to contact the mobile device at a second location and a second time; and (iii) record, by the robotic testing device, a response of the mobile device in memory of the robotic testing device. The system also includes a third robotic implement having a cross-member structure configured to engage a rocker button of the mobile device.

In another aspect, the invention features a system for robotic testing of a mobile device with a robotic testing device. The system includes a holder configured to secure the mobile device to the robotic testing device. The system also includes a first robotic implement configured to move along a first axis to interact with the mobile device. The system also includes a first motor operatively coupled to the first robotic implement and configured to actuate the first robotic implement. The system also includes a second robotic implement configured to move along a second axis to interact with the mobile device. The system also includes a second motor operatively coupled to the second robotic implement and configured to actuate the second robotic implement. The system also includes a processor programmed with computer readable instructions to execute computer program instructions configured to cause the processor to: (i) actuate, via the first motor, the first robotic implement to contact the mobile device at a first location and a first time; (ii) actuate, via the second motor, the second robotic implement to contact the mobile device at a second location and a second time; and (iii) record, by the robotic testing device, a response of the mobile device in memory of the robotic testing device. The system further includes a third motor operatively coupled to the holder and configured to move the holder to emulate a human movement.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

DETAILED DESCRIPTION

Figure 1:
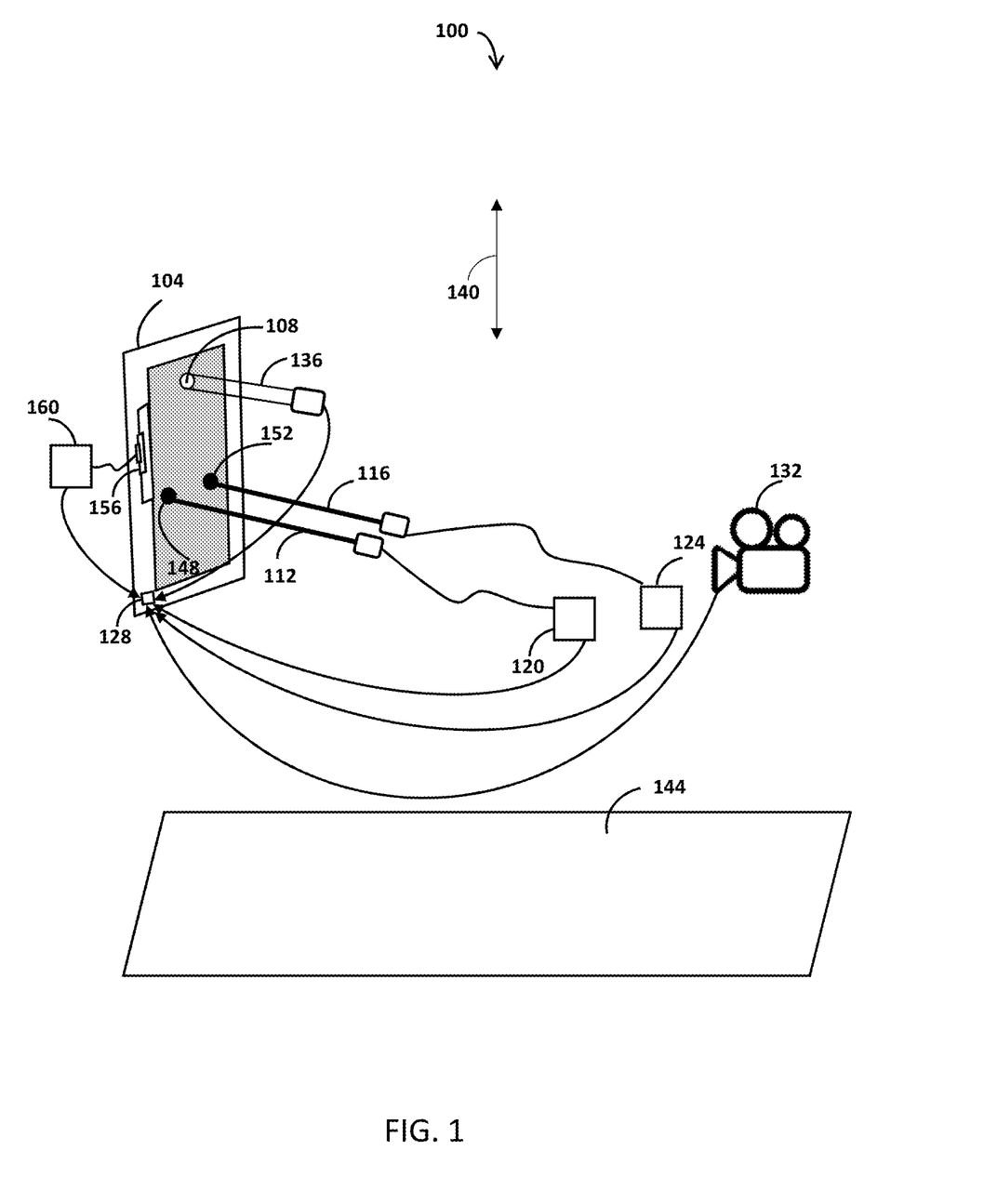
FIG. 1 is a schematic diagram of a mobile automation testing robot, according to an illustrative embodiment of the invention.

FIG. 1 is a schematic diagram of a mobile automation testing robot 100, according to an illustrative embodiment of the invention. The mobile automation testing robot 100 includes a holder 104 for securing a mobile test device 108, a first robotic implement 112, and a second robotic implement 116. The first and second robotic implements 112, 116 are operably connected to first and second motors 120, 124, respectively, which actuate the robotic implements 112, 116 toward the mobile test device 108. The mobile automation testing robot 100 also includes a data processor 128, which is capable of recording a response of the mobile test device 108 in memory, e.g., by receiving input from one or more recording devices, such as the camera 132. The mobile automation testing robot 100 can also include a pressure feedback sensor 136, e.g., for sensing a feedback pressure imparted onto the mobile test device 108 by one or more parts of the mobile automation testing robot 100. The pressure feedback sensor 136 can be attached to an arm (e.g., arm 320 as shown and described below in connection with FIG. 3), which can be configured to rotate and/or translate. The mobile automation testing robot 100 can be positioned vertically (e.g., in a vertical orientation 140) with respect to a ground plane 144.

In operation, the mobile automation testing robot 100 can actuate, via the first motor 120, the first robotic implement 112 to contact the mobile test device 108 at a first location 148 at a first time. Similarly, the mobile automation testing robot 100 can actuate, via the second motor 124, the second robotic implement 116 to contact the mobile test device 108 at a second location 152 at a second time. In some embodiments, the mobile automation testing robot 100 can also include other robotic implements, such as the third robotic implement 156, which can be operatively connected to a third motor 160. The first and second robotic implements 112, 116 can each be one of a stylus, a pointer, or a finger-type implement. The third robotic implement 156 can have a cross-member or cross-hair structure and/or a rocker button.

Each individual robotic implement can move in a variety of patterns, such as swipes, clicks, double-clicks, flicks, and more, each with varying degrees of contact with the mobile test device 108 (e.g., for different durations, with varying linear or angular speeds or accelerations, and with different pressures). At least one of the first and second robotic implements can be configured to emulate one or more of the following human movements on the mobile device: a light touch click; a hard touch click; a hard touch click-and-hold; a rotation; a shaking motion; a pinch-open motion to zoom in on the mobile device; a pinch-close motion to zoom out on the mobile device; a force touch; an acceleration of the mobile device; a dual touch; a long press; an object drag on a screen of the mobile device; and/or a swipe motion.

The mobile automation testing robot 100 can be configured such that a distance between a center of the first robotic implement 112 and a center of the second robotic implement 116 is as low as three millimeters. The robotic testing device mobile automation testing robot can be installed with software configured to determine whether an error has occurred on the mobile device and to log any errors detected. The mobile automation testing robot 100 can include a video camera 132, e.g., for either recording interactions of the mobile automation testing robot 100 with the mobile testing device 108 or facilitating interactions of the robotic testing device 100 with the mobile testing device 108. One or both of the robotic implements 112, 116 can be configured to move along respective axes. In some embodiments, robotic implement 112 is fixed. In some embodiments, robotic implement 116 moves along a horizontal direction, e.g., to facilitate a "zoom in" motion. The robotic implements 112, 116 can each further include one or more haptic feedback sensors in electronic communication with the processor 128.

Figure 2:
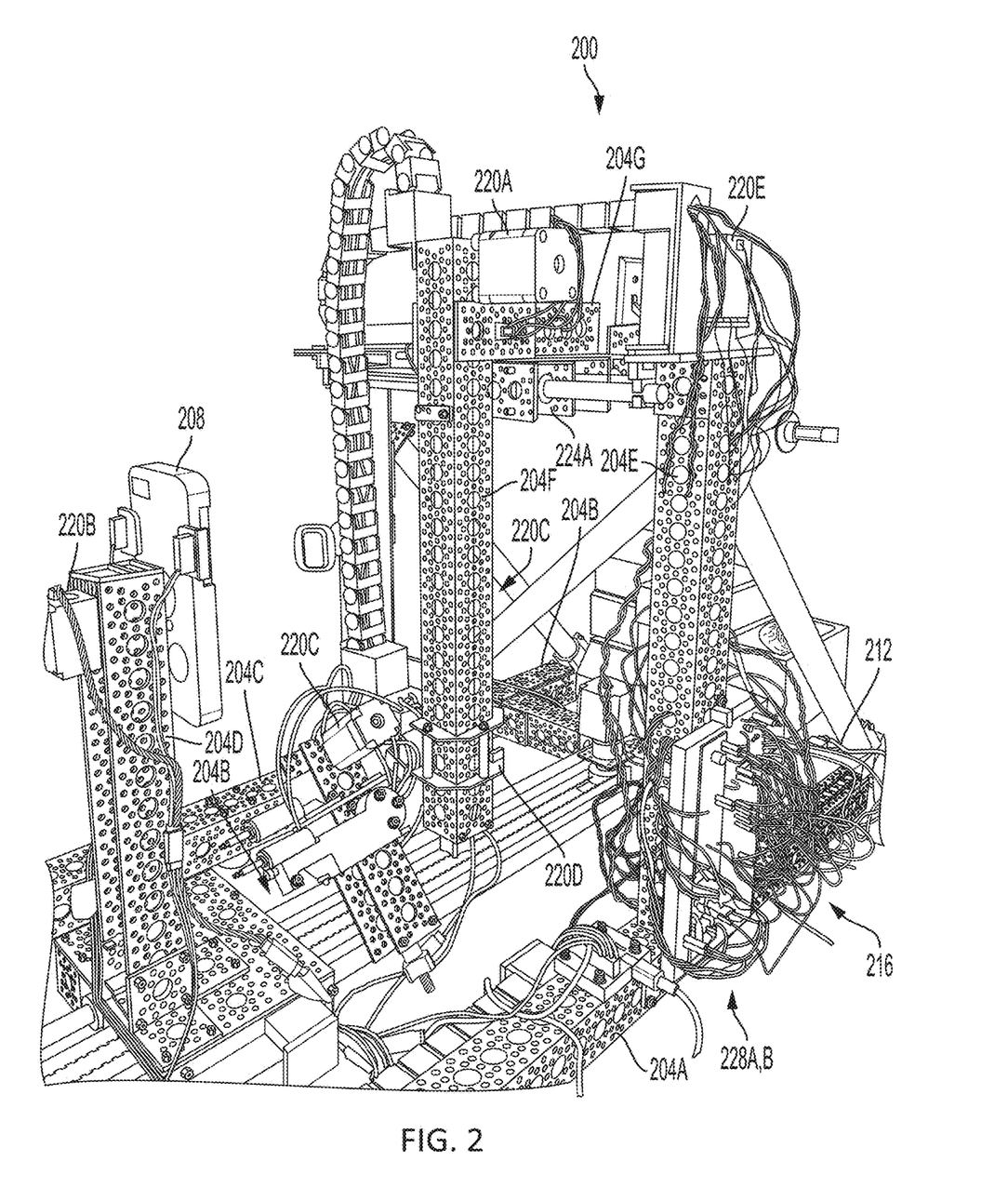
FIG. 2 is an illustration of a mobile automation testing robot, according to an illustrative embodiment of the invention.

FIG. 2 is an illustration of a mobile automation testing robot 200, according to an illustrative embodiment of the invention. The mobile automation testing robot 200 can include the basic components shown and described above in connection with FIG. 1, but additional details and components are also shown in FIG. 2 to further illustrate one specific real-world construction of the mobile automation testing robot 200. For example, the mobile automation testing robot 200 includes base structural members 204A-C, which together form the robot base; structural member 204D, which can support the holder 208; structural members 204E-F, which can extend vertically from the base; and structural member 204G, which can act as a cross-member supported by structural members 204E-F. In some embodiments, cross-members can help prevent vibrations, e.g., when belt drives are moving quickly.

A processor can be in communication with a Raspberry pie interface 212 and can command the Breadboard 216, which controls the servo motors 220A-E. The servo motors 220A-E can each be operatively connected to belt-driven systems 224A-C that provide speed and acceleration (e.g., for a swipe action). The servo controllers 228A, B control the servo motors 220A-E. One or more of the motors 220A-E can be in electronic communication with one or more of the servo controllers 228A, B. In some embodiments, the robot 200 interacts with the mobile device 208 using 100 percent physical contact, as distinguished from some older solutions that use software (which can itself fail or be susceptible to bugs).

In some embodiments, the robot 200 includes a controller layer that includes a host for connecting to individual devices, such as the servo controllers or stepper motor boards. The host sends commands to the servo board (e.g., servo ID, speed, position, acceleration) and to the stepper board (e.g., motor calibrations, set position). In some embodiments, the robot 200 has a thread to allow concurrent running of a host program, a stepper motor board control code, and a servo controller code. In some embodiments, JSON Notation can be used to simplify data transfer between Python and JAVA. Commands can be in the following exemplary format: {"Command": Name, "Params": [Param1, Param2, . . . ParamN]}. These JSON objects can in turn be encoded as strings on the JAVA side and sent to Python, where they arrive as streams. In some embodiments, the Python command for decoding the data is as follows: outData=json.loads(inputData) where outData is a dictionary that has a two keys:

Key #1: Command, Value: String
Key #2: Params, Value: String ArrayList

As an example, consider a command that is sent to move the end-effector (e.g., the "press" command, which also applies to the force touch stylus to pass a force. The output string from Java would be:
'{"Command": "move","Params": ["pos_x","pos_y"]}'
After parsing the string using Python's JSON decoder, the output dictionary would be:
outData['Command']=move
outData['Params'][0]=pos_x
outData['Params'][1]=pos_y Below is an exemplary list of commands. Required keywords are denoted with an asterisk (*), and optional parameters are denoted with a superscript plus sign (±) and explained in the command definition:
Motion Primitives
1. Move Arm:
   a. {"Command": Move*, "Params": [pos_x,pos_y]*}
2. Button Press:
   a. {"Command": press*, "Params": [buttonName] *}
   (Button Names: "volumeUp","volumeDown","home", "power") 3. Extend End-effector:

a. {"Command": extend*, "Params": [endEffectorName*, pwm+]
   (End Effector Names: main, secondary, force)
   (pwm is an optional parameter and is only defined for force-sensitive touch)
   (i.e. end effector name=force). It specifies the pwm signal for the linear actuator.
Gestures
1. Rotate:
   a. {"Command": Rotate*, "Params": [pos_x,pos_y]*}
   (Hardcoded to make arm rotate+90 degrees from the horizontal around the axis specified by pos_x and pos_y.)
2. Dual double touch:
   a. {"Command": Dual Double Touch*, "Params": [pos_x1,pos_y1,pos_x2,pos_y2]*}
3. Dual long-press drag:
   a. {"Command": Dual Long-Press Drag*, "Params": [pos_x1Start,pos_y1Start,pos_x2Start,pos_y2Start, pos_x1End,pos_x1End]*}
4. Dual long-press:
   a. {"Command": Dual Long-Press*, "Params": [pos_x1,pos_y1,pos_x2,pos_y2]*}
5. Dual swipe:
   a. {"Command":Dual Swipe, "Params": [pos_x1Start,pos_y1Start,pos_x2Start,pos_y2Start, pos_x1End,pos_x1End]*}
6. Dual touch:
   a. {"Command": Dual Touch*, "Params": [pos_x1, pos_y1,pos_x2,pos_y2]*}
7. Pinch closed:
   a. {"Command": Pinch Closed*, "Params": [pos_x1, pos_y1,pos_x2,pos_y2]*}
8. Pinch open:
   a. {"Command": Pinch Open*, "Params": [pos_x1, pos_y1,pos_x2,pos_y2]*}
9. Double-touch drag:
   a. {"Command": Double-Touch Drag*, "Params": [pos_x1Start,pos_y1Start,pos_x2Start,pos_y2Start, pos_x1End,pos_x1End] *}
10. Long-press drag:
    a. {"Command": Long-Press Drag*, "Params": [pos_xStart,pos_yStart,pos_xEnd,pos_yEnd]*}
11. Long-press:
    a. {"Command": Long-Press*, "Params": [pos_x, pos_y]*}
12. Touch:
    a. {"Command": Touch*, "Params": [pos_x,pos_y]*}
13. Double touch:
    a. {"Command": Double Touch*, "Params": [pos_x, pos_y]*}
14. Swipe:
    a. {"Command": Swipe*, "Params": [pos_xStart,pos_yStart,pos_xEnd,pos_yEnd]*}
System Operation
1. Home Chassis:
   a. {"Command": Home, "Params": [DoF]}
   (Degrees of Freedom (DoF): x, y, z, endEffectors,all)
2. Homography (Currently Unused):
   a. Currently calculated on Java front end
   (Command will be added when computation is moved to Python back end.)

Figure 3:
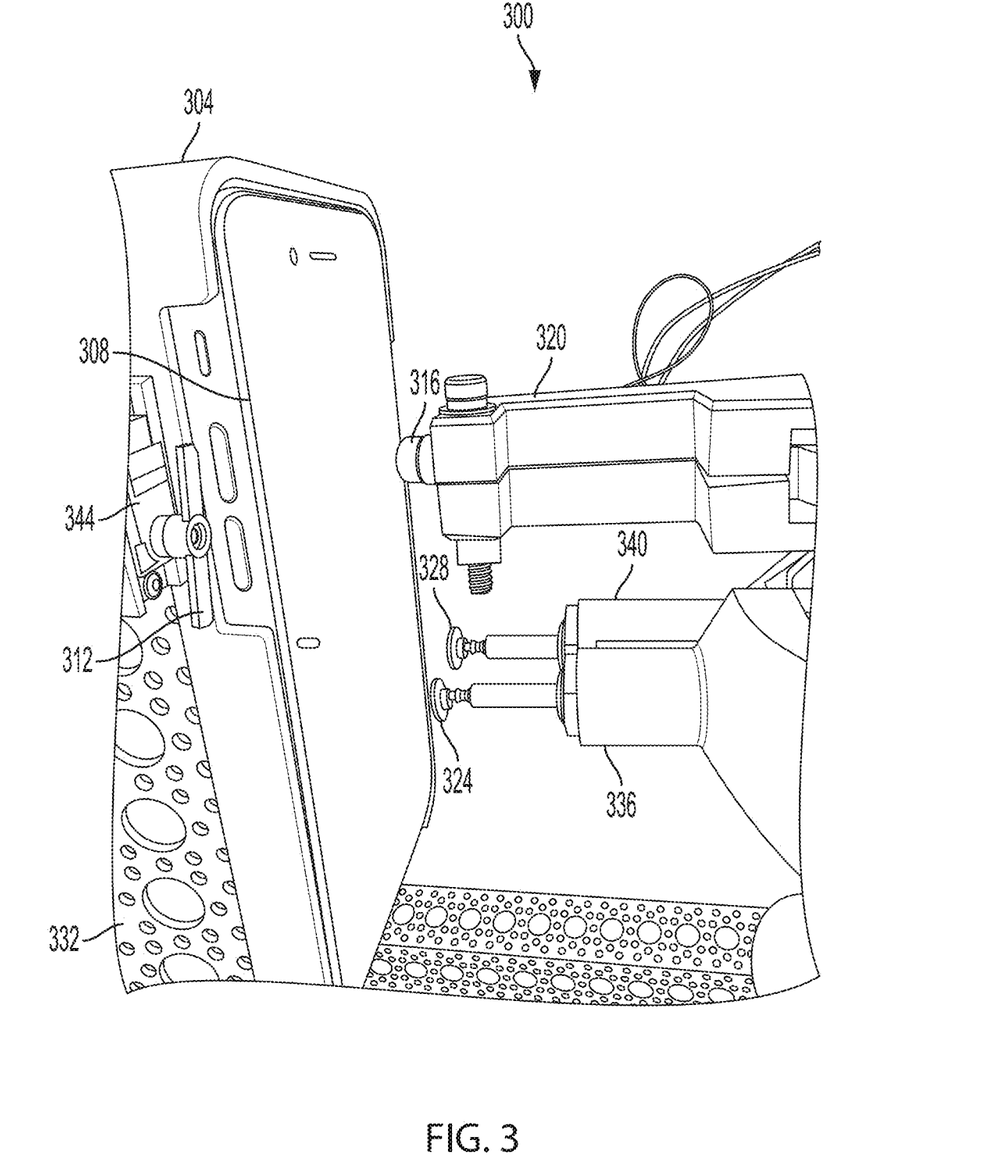
FIG. 3 is a close-up illustration of a mobile automation testing robot having a holder, a rocker button, a pressure sensor button, and two pointers, according to an illustrative embodiment of the invention.

FIG. 3 is a close-up illustration of a mobile automation testing robot 300 having a holder 304 (e.g., for holding a mobile device 308), a rocker button 312, a pressure sensor button 316 extending from arm 320, and two pointers 324, 328, according to an illustrative embodiment of the invention. The holder 304 can be mounted on structural member 332 (e.g., the member 204F shown and described above in FIG. 2). The pointers 324, 328 can extend from arms 336, 340 respectively and can each include a stylus-type pointer that emulates contact created by a human finger and approximates movements such as inching and zooming. The pointers 324, 328 can also be configured to perform acceleration swiping (e.g., the robot 300 can "flick" one or more pointers, e.g., in scrolling to the end of a long agreement). The pointers 324, 328 can be manufactured of any capacitive substance with a low friction point, e.g., something that will not stick or wear out over time. The pressure sensor button 316 can be gas-powered and can include an actuator 344 that depresses the rocker button 312 (e.g., to turn the volume of the phone down or up). The rocker button 312 can have a propeller shape as shown, but can also take an X- or cross-hair shape. The rocker button 312 can perform motions such as a "light touch," a "hard touch," a "hard touch and hold," and/or other desired motions.

Figure 4:
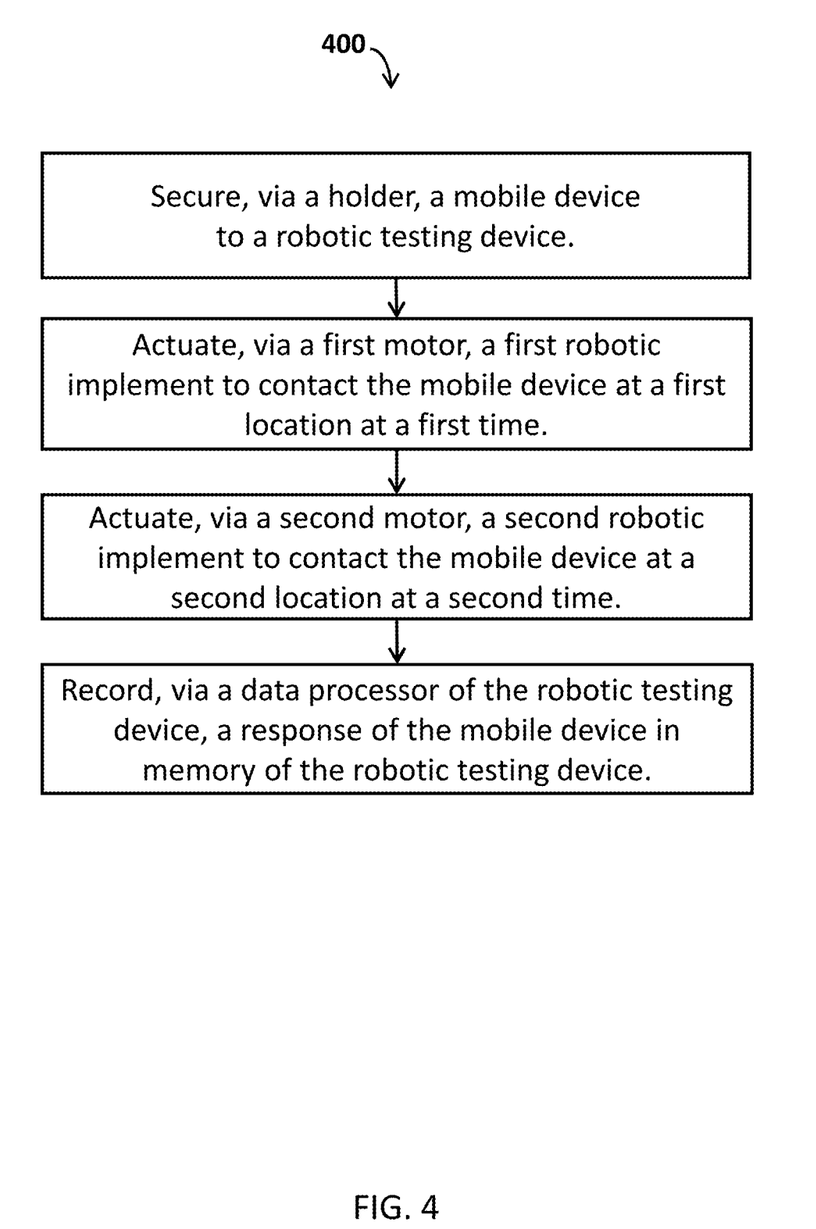
FIG. 4 is a flow chart showing a method of testing a mobile device with a robotic testing device, according to an illustrative embodiment of the invention.

FIG. 4 is a flow chart showing a method 400 of testing a mobile device with a robotic testing device, according to an illustrative embodiment of the invention. In some embodiments, the robotic testing device includes a holder, a first motor operatively connected to a first robotic implement, and a second motor operatively connected to a second robotic implement. In some embodiments, the method includes securing, via the holder, the mobile device to the robotic testing device. In some embodiments, the method also includes actuating, via the first motor, the first robotic implement to contact the mobile device at a first location at a first time. In some embodiments, the method also includes actuating, via the second motor, the second robotic implement to contact the mobile device at a second location at a second time. In some embodiments, the method also includes recording, via a data processor of the robotic testing device, a response of the mobile device in memory of the robotic testing device.

In some embodiments, the robotic testing device includes a pressure feedback sensor configured to sense a pressure of one or more of the robotic implements while interacting with the mobile device. In some embodiments, the first and second robotic implements are each one of a stylus, a pointer, or a finger-type implement capable of controllably contacting the mobile device with multiple distinct levels of force. In some embodiments, the robotic testing device further includes a pressure sensor configured to monitor or mediate a pressure of one or more of the robotic implements while interacting with the mobile device. In some embodiments, the method includes moving, by a third motor coupled to the holder, the holder to emulate a human movement. In some embodiments, the method includes engaging, via the third motor, by the third robotic implement, a rocker button of the mobile device, the third robotic implement having a cross-member structure. In some embodiments, the method includes recording, by the robotic testing device, a response of the mobile device in memory of the robotic testing device. In some embodiments, the robotic testing device further includes a pressure sensor configured to monitor or mediate a pressure of one or more of the robotic implements while interacting with the mobile device.

The above-described techniques can be implemented in digital and/or analog electronic circuitry, or in computer hardware, firmware, software, or in combinations of them. The implementation can be as a robot; as a computer program product, i.e., a computer program tangibly embodied in a machine-readable storage device, for execution by, or to control the operation of, a data processing apparatus, e.g., a programmable processor, a computer, and/or multiple computers; or as both. Method steps can be performed by one or more processors executing a computer program to perform functions of the invention by operating on input data and/or generating output data.

To provide for interaction with a user, the above described techniques can be implemented on a computing device in communication with a display device, e.g., a plasma or LCD (liquid crystal display) monitor or a mobile computing device display or screen for displaying information to the user and a keyboard and a pointing device, e.g., a mouse, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

In some embodiments, software elements used include Python (e.g., Python 2.7), Hadoop distribution, and/or PyQT. In some embodiments, hardware elements used include a computing system and Hadoop cluster nodes. In some embodiments, data sources used including databases storing customer chat interactions phone transcripts, and/or web search queries.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A method of testing a mobile device with a robotic testing device having a holder, a first motor operatively connected to a first robotic implement, and a second motor operatively connected to a second robotic implement, the method comprising:
   securing, via the holder, the mobile device to the robotic testing device;
   actuating, via the first motor, the first robotic implement to contact the mobile device at a first location at a first time;
   actuating, via the second motor, the second robotic implement to contact the mobile device at a second location at a second time;
   recording, via a data processor of the robotic testing device, a response of the mobile device in memory of the robotic testing device; and
   engaging, by a third robotic implement of the robotic testing device, a rocker button of the mobile device, the third robotic implement having a cross-member structure,
   wherein the robotic testing device includes a pressure feedback sensor configured to sense a pressure of one or more of the robotic implements while interacting with the mobile device.

2. The method of claim 1 wherein the first motor is operatively connected to a first belt-driven system and the second motor is operatively connected to a second belt-driven system.

3. The method of claim 1 wherein the first and second motors are servo motors that are in electronic communication with first and second servo controllers, respectively, and the first and second servo controllers are in electronic communication with a host controller.

4. The method of claim 1 wherein the first and second motors are stepper motors that are in electronic communication with first and second stepper controllers, respectively.

5. The method of claim 4 wherein the first and second stepper controllers are in electronic communication with a host controller.

6. The method of claim 1 wherein the first and second robotic implements are each one of a stylus, a pointer, or a finger-type implement.

7. The method of claim 1 further including moving, by a third motor operatively coupled to the holder, the holder to emulate a human movement.

8. The method of claim 1 wherein at least one of the first and second robotic implements are configured to emulate one or more of the following human movements on the mobile device: a light touch click; a hard touch click; a hard touch click-and-hold; a rotation; a shaking motion; a pinch-open motion to zoom in on the mobile device; a pinch-close motion to zoom out on the mobile device; a force touch; an acceleration of the mobile device; a dual touch; a long press; an object drag on a screen of the mobile device; a swipe motion.

9. The method of claim 1 wherein the mobile device is positioned vertically or near vertically with respect to a ground plane.

10. The method of claim 1 wherein the robotic testing device is configured such that a distance between a center of the first robotic implement and a center of the second robotic implements is as low as three millimeters.

11. The method of claim 1 wherein the robotic testing device is installed with software configured to determine whether an error has occurred on the mobile device and to log any errors detected.

12. The method of claim 1 wherein the robotic testing device further includes a video camera, the video camera for either recording interactions of the robotic testing device with the mobile device or facilitating interactions of the robotic testing device with the mobile device.

13. A system for robotic testing of a mobile device with a robotic testing device, the system comprising:
   a holder configured to secure the mobile device to the robotic testing device;
   a first robotic implement configured to move along a first axis to interact with the mobile device;
   a first motor operatively coupled to the first robotic implement and configured to actuate the first robotic implement;
   a second robotic implement configured to move along a second axis to interact with the mobile device;
   a second motor operatively coupled to the second robotic implement and configured to actuate the second robotic implement;
   a third robotic implement having a cross-member structure configured to engage a rocker button of the mobile device; and
   a processor programmed with computer readable instructions to execute computer program instructions configured to cause the processor to:
      actuate, via the first motor, the first robotic implement to contact the mobile device at a first location at a first time;
      actuate, via the second motor, the second robotic implement to contact the mobile device at a second location at a second time; and
      record, by the robotic testing device, a response of the mobile device in memory of the robotic testing device,
   wherein the robotic testing device includes a pressure feedback sensor configured to sense a pressure of one or more of the robotic implements while interacting with the mobile device.

14. The system of claim 13 wherein the first motor is operatively connected to a first belt-driven system and the second motor is operatively connected to a second belt-driven system.

15. The system of claim 13 wherein the first and second motors are servo motors that are in electronic communication with first and second servo controllers, respectively, and the first and second servo controllers are in electronic communication with a host controller.

16. The system of claim 13 wherein the first and second motors are stepper motors that are in electronic communication with first and second stepper controllers, respectively.

17. The system of claim 16 wherein the first and second stepper controllers are in electronic communication with a host controller.

18. The system of claim 13 wherein the first and second robotic implements are each one of a stylus, a pointer, or a finger-type implement.

19. The system of claim 13 further including a third motor coupled to the holder and configured to move the holder to emulate human movement.

20. The system of claim 13 wherein at least one of the first and second robotic implements are configured to emulate one or more of the following human movements on the mobile device: a light touch click; a hard touch click; a hard touch click-and-hold; a rotation; a shaking motion; a pinch-open motion to zoom in on the mobile device; a pinch-close motion to zoom out on the mobile device; a force touch; an acceleration of the mobile device; a dual touch; a long press; an object drag on a screen of the mobile device; a swipe motion.

21. The system of claim 13 wherein the mobile device is positioned vertically or near vertically with respect to a ground plane.

22. The system of claim 13 wherein the robotic testing device is configured such that distance between a center of the first robotic implement and a center of the second robotic implements is as low as three millimeters.

23. The system of claim 13 wherein the robotic testing device is installed with software configured to determine whether an error has occurred on the mobile device and to log any errors.

24. The system of claim 13 wherein the robotic testing device further includes a camera for recording interactions of the robotic testing device with the mobile device on video.

25. A method of testing a mobile device with a robotic testing device having a holder, a first motor operatively connected to a first robotic implement, and a second motor operatively connected to a second robotic implement, the method comprising:
   securing, via the holder, the mobile device to the robotic testing device;
   actuating, via the first motor, the first robotic implement to contact the mobile device at a first location at a first time;
   actuating, via the second motor, the second robotic implement to contact the mobile device at a second location at a second time;
   recording, via a data processor of the robotic testing device, a response of the mobile device in memory of the robotic testing device; and
   engaging, by a third robotic implement of the robotic testing device, a rocker button of the mobile device, the third robotic implement having a cross-member structure;
   wherein the first and second robotic implements are each one of a stylus, a pointer, or a finger-type implement capable of controllably contacting the mobile device with multiple distinct levels of force, and
   wherein the robotic testing device includes a pressure feedback sensor configured to sense a pressure of one or more of the robotic implements while interacting with the mobile device.

26. The method of claim 25 wherein the first and second robotic implements each further include one or more haptic feedback sensors in electronic communication with the processor.

27. A system for robotic testing of a mobile device with a robotic testing device, the system comprising:
- a holder configured to secure the mobile device to the robotic testing device;
- a first robotic implement configured to move along a first axis to interact with the mobile device;
- a first motor operatively coupled to the first robotic implement and configured to actuate the first robotic implement;
- a second robotic implement configured to move along a second axis to interact with the mobile device;
- a second motor operatively coupled to the second robotic implement and configured to actuate the second robotic implement;
- a third robotic implement having a cross-member structure configured to engage a rocker button of the mobile device; and
- a processor programmed with computer readable instructions to execute computer program instructions configured to cause the processor to:
    - actuate, via the first motor, the first robotic implement to contact the mobile device at a first location and a first time;
    - actuate, via the second motor, the second robotic implement to contact the mobile device at a second location and a second time; and
    - record, by the robotic testing device, a response of the mobile device in memory of the robotic testing device;
- wherein the first and second robotic implements are each one of a stylus, a pointer, or a finger-type implement capable of controllably contacting the mobile device with multiple distinct levels of force, and
- wherein the robotic testing device includes a pressure feedback sensor configured to sense a pressure of one or more of the robotic implements while interacting with the mobile device.

28. The system of claim 27 wherein the first and second robotic implements each further include one or more haptic feedback sensors in electronic communication with the processor.

\* \* \* \* \*